Sept. 19, 1961  F. H. ECKARDT  3,000,240
ECCENTRICALLY ADJUSTABLE TOOL HOLDER
Filed June 6, 1960
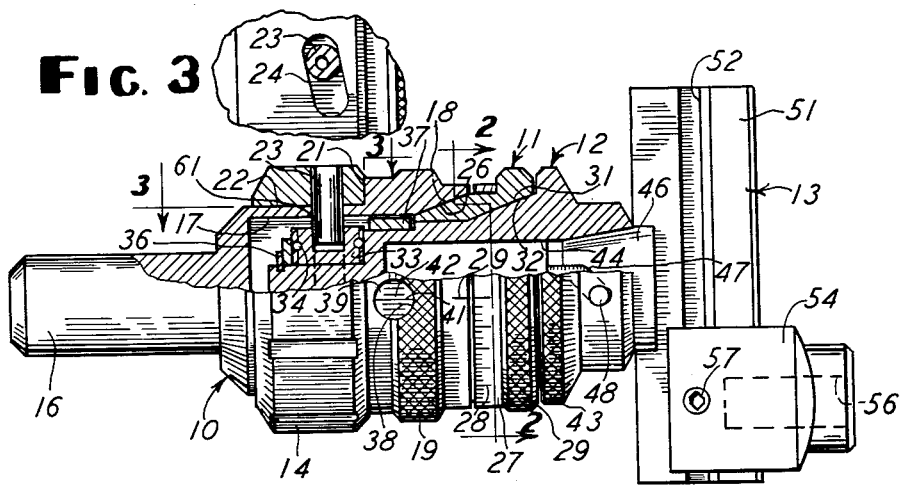
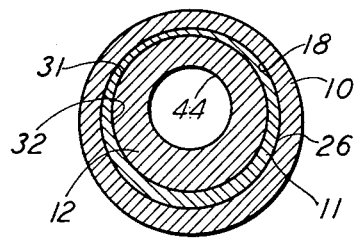
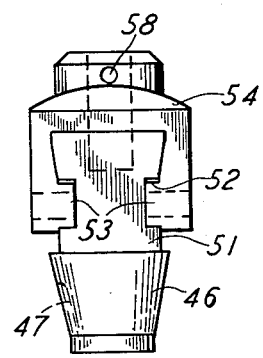
INVENTOR:
FREDERICK H. ECKARDT
BY: *Arthur J. Hansmann*
ATTORNEY

3,000,240
ECCENTRICALLY ADJUSTABLE TOOL HOLDER
Frederick Helmut Eckardt, 2117 N. Green Bay Road, Racine, Wis.
Filed June 6, 1960, Ser. No. 34,189
6 Claims. (Cl. 77—58)

This invention relates to a machine tool holder, and more particularly, it relates to a holder having a multiplicity of eccentrics thereon such that the working tool can be offset with respect to the axis of rotation.

It is an object of this invention to provide a tool holder which has a greater degree of both radial offset with respect to the center of rotation of the tool holder and a greater degree of fine adjustment than that heretofore known in tool holders.

Another object of this invention is to provide a tool holder for use in a boring mill or the like which can be readily and easily radially offset to correspondingly offset the working tool and which can be readily and easily locked into the desired offset position.

Still another object of this invention is to provide a tool holder of the type having eccentric bores for offsetting the tool with respect to the axis of rotation and wherein the parts of the holder are sturdy and inexpensive in manufacture and are sufficiently simple to permit accurate and easy adjustment of the holder.

Other objects and advantages will become apparent upon reading the following description in light of the accompanying drawings wherein:

FIG. 1 is a side elevational view of a preferred embodiment of this invention and with an upper part thereof broken away to show the interior of the tool.

FIG. 2 is a sectional view taken on the line 2—2 of FIG. 1.

FIG. 3 is a sectional view taken on the line 3—3 of FIG. 1.

FIG. 4 is an end view of one of the tool holding members of this invention.

The same reference numerals refer to the same parts throughout the several views.

The drawings show the tool to consist of the housing or main body portion generally designated 10 and a ring 11 and a tool holding member 12 and a second or another tool holding member 13. These several parts, therefore constitute the series of parts of the tool holder and it will be noted and understood that the parts 10, 11, and 12 are telescopically and rotatably arranged with respect to each other. A locking member or ring 14 is also telescoped with respect to the main member 10 and, as will be described hereinafter, the ring 14 functions to rotatively lock the members 10, 11, and 12 into non-rotative relation with respect to each other.

A housing member 10 consists of a shank 16 which can of course be chucked or otherwise clamped into a boring machine or the like for rotation of the member 10 and the entire holder about the central axis of the cylindrical exterior surface of the shank 16, all in the usual manner of mounting and rotating a tool holder in a machine. It will be noted that the member 10 has an interior opening 17 which is circular and the end of the member 10 has a conical and eccentric portion or surface 18. The member 10 also has a raised, knurled portion 19 and it has a circular shoulder 21. It will be noted that the ring 14 is rotatably disposed over the circular surface 22 on the member 10 and the ring abuts the shoulder 21, to provide interengaged surfaces comprised of shoulder 21 and the abutting side of the ring 14, and carries a locking pin 23 which extends through a diagonal slot 24 in the ring 14 and the pin 23 of course also extends through a circular opening in the member 10 so that the pin 23 is snug with the member 10 except for movement axially of the pin 23 such that the latter can be inserted and withdrawn both with respect to the member 10 and the ring 14. The particular purpose of the locking pin 23 and the diagonal slot 24 will be described later.

The ring 11 is also provided with a conical surface 26 and this surface is shown to be and is formed to be in circular and snug abutting contact with the conical surface 18 on the member 10. Also, the ring 11 has a dial 27 fixed thereto and it has the usual marking 28 thereon for alignment with the mark 29 on the outer circumference of the housing 10. Thus, of course the dial 27 rotates with the ring 11 and the ring 11 is knurled on its outer circumference 29 as shown.

The member 12 has a conical surface 31 which meets and abuts with the eccentric and conical surface 32 on the ring 11. The end of the member 12 is disposed within the bore 17 of the member 10 and carries thrust bearing 33 which is provided with ball bearings 34 for easy rotation of the member 12 with respect to the member 10. The usual type of snap ring 36 engages the end of the member 12 to secure the thrust bearing 33 on the member 12 in a conventional manner. It will of course be noted that the member 12 also carries a circular dial 37 which rotates with the member 12 and the member 10 has an opening 38 in which a magnifying glass 39 may be disposed to carry the hair-line 41 to permit the rotative positioning of the members 10 and 12 with respect to the hair-line 41 and the graduation 42 on the dial 37. The member 12 is also provided with the knurled outer diameter 43 to permit easy rotation of the member with respect to the ring 11 and the house 10. Also, the member 12 has an eccentric opening 44 which receives a shank or the like 46 of the tool holder 13 and an angled groove 47 is shown in the shank 46 to receive a pin 48 which passes through the member 12 and into the groove 47 to complete a bayonet type of connection between the member 12 and the shank 46 and thereby lock the latter in the desired direction of rotation for the tool to be supported by this holder.

FIG. 2 shows the arrangement of the eccentric opening in the various parts described.

It will now also be understood that the pin 23 passes through the diagonal slot 24 and is engaged with the thrust bearing 33 such that displacement of the pin with respect to the longitudinal axis of the member 10 will cause the pin to axially displace the member 12 and thereby force the member 12 inwardly against the conical surface 32 of the member 11 which in turn is forced inwardly against the conical surface 18 of the member 10 when the ring 14 is rotated in the direction to move the pin 23 to the left as viewed in FIGS. 1 and 3, and this action of course locks the parts 10, 11, and 12 into rotative relation. Of course it will be understood that the various parts are initially rotated to the desired position on the dials 27 and 37 so that the offset or eccentricity of the bore 44 is as desired, and then the telescoping parts are locked as described. Of course the particular locking arrangement simply requires the rotation of the locking ring 14 so that it bears against the pin 23 to displace the latter axially of the housing 10 as mentioned.

The member 13 is shown to include the shank 46 which carries the bar 51 and disposes the latter transverse to the axis of the members 10, 11, and 12. The bar 51 has side slots 52 therein for receiving tongues or projections 53 on a tool receiving member 54 which is slideable over the bar 51 and therealong. The piece 54 has an opening 56 disposed with the axis thereof parallel to the axis of the tool holder for receiving the working tool (not shown) which of course would be a conventional boring tool or the like which is offset with respect to the axis of the tool holder as comprised by parts 10, 11, and 12. Set screws 57 are provided in the two sides of the piece 54 to secure the latter longitudinally with respect to the bar 51 as desired. Also, a set screw 58 extends through the piece 54 to secure the boring tool or the like to the piece 54.

Thus, a series of rotatable members is provided, and a thrust lock secures them in a rotationally set position. Of course, the lock bearing 33 is provided with a circular groove 61 which extends around the spool-shaped bearing and receives the inner end of the pin 23, and another pin 23 and housing slot 24 are included diametrically opposite the ones shown. Also, the two dials 27 and 42 can carry different scales for different adjustments therebetween, and one can be a rough adjustment and the other a fine adjustment. By virtue of the two eccentrics on ring 11 and member 12, the eccentric bore 44 can be placed on-center and considerably off-center but with great accuracy and ease.

While a specific embodiment of this invention has been shown and described, it should be obvious that certain changes could be made in the embodiment, and this invention should, therefore, be limited only by the scope of the appended claims.

What is claimed is:

1. An eccentrically adjustable tool holder comprising a housing including a shank at one end for mounting in a boring machine and having an eccentric conical bore in the other end thereof and said housing having a mark thereon, a ring having one end thereof telescopically and rotatably disposed in said bore with a mating conical outside diameter and having an eccentric conical bore in the other end thereof, a tool holding member having one end thereof telescopically and rotatably disposed in said bore of said ring with a mating conical outside diameter and having an eccentric conical bore in the other end thereof for receiving a tool, a scale on said ring and said member for rotative alignment with said mark on said housing and indicating the rotative relation between said housing and said ring and said member, and an axially displaceable means connected between said housing and said member and operative thereon for forcing the mating conical surfaces into snug contact to secure said housing and said ring and said member against relative rotation.

2. An eccentrically adjustable tool holder comprising a series of cylindrically-shaped first member and a second member and a third member all telescopically and rotatably disposed, one end of said series being adapted for mounting in a machine tool and the other end of said series having an opening for receiving a working tool, the telescoping portions of all said members being conical and eccentric for radially offsetting one of all said members with respect to the other ones of all said members upon relative rotation of all said members, marking scales disposed on all said members for indicating the degree of rotative relation therebetween, and releasable locking means connected to at least one of all said members for axially forcing all said members together on their conical portions to secure all said members in rotative relation.

3. An eccentrically adjustable tool holder comprising a housing including a shank at one end for mounting in a boring machine and having an eccentric conical bore in the other end thereof, said housing having a radial opening therethrough and a hair-line disposed in said opening axially of said housing, a ring having one end thereof telescopically and rotatably disposed in said bore with a mating conical outside diameter and having an eccentric conical bore in the other end thereof, a tool holding member having one end thereof telescopically and rotatably disposed in said bore of said ring with a mating conical outside diameter and extending through said ring and beyond said radial opening in said housing and having an eccentric conical bore in the other end thereof for receiving a tool, an axial thrust bearing on the extending end of said member, a scale on said ring and said member for rotative positioning with respect to said hair-line on said housing and indicating the rotative relation between said housing and said ring and said member, and an axially displaceable means connected between said housing and said thrust bearing on said member and operative thereon for forcing the mating conical surfaces into snug contact to secure said housing and said ring and said member against relative rotation.

4. An eccentrically adjustable tool holder comprising a series of cylindrically-shaped members including a first member and a second member and a third member all telescopically and rotatably disposed, said first member being adapted for mounting in a boring machine and said third member having an eccentric opening for receiving a boring tool, a tool-holding member disposed in said eccentric opening and including a portion extending transverse to the axis of said eccentric opening, a tool receiving member mounted on said portion and having a socket for receiving a tool and being adjustably slideable therealong for selectively offsetting said tool with respect to said axis, the telescoping portions of all said members being conical and eccentric for radially offsetting one of all said members with respect to the other ones of all said members upon relative rotation of said one of all said members, marking scales disposed on all said members for indicating the degree of rotative relation therebetween, and releasable locking means connected to at least one of all said members for axially forcing all said members together on their conical portions to secure all said members in rotative relation.

5. An eccentrically adjustable tool holder comprising a housing including a shank at one end for mounting in a boring machine and with said housing having an eccentric conical bore surface in the other end thereof and said housing having a slot therethrough intermediate said ends thereof and being diagonally disposed with respect to the axis of said housing and extending to said bore and said housing having a mark thereon, a ring having one end thereof telescopically and rotatably disposed in said bore with a mating conical outside diameter surface and having an eccentric conical bore in the other end thereof, a tool holding member having one end thereof telescopically and rotatably disposed in said bore of said ring with a mating conical outside diameter surface and having an eccentric conical bore surface in the other end thereof for receiving a tool, a scale on said ring and said member for rotative alignment with respect to said mark on said housing and indicating the rotative relation between said housing and said ring and said member, a locking ring rotatably disposed on said housing and axially engaging the latter, a pin connected to said ring and extending through said slot in said housing and axially engaging said one end of said tool holding member and being displaceable axially of said housing to force on said tool holding member for forcing all the mating conical surfaces into respective snug contact to secure said housing and said ring and said member against relative rotation.

6. An eccentrically adjustable tool holder comprising a series of cylindrically shaped members all telescopically and rotatably disposed and having eccentric conical surfaces in abutting mating relation, one member of said members having a central bore therein and a slot extending therethrough to said bore and being diagonally disposed with respect to the axial ends of said one member, a ring rotatably disposed on said one member, a pin connected to said ring and extending through said slot and into said central bore, a pin engaging portion on another member of said members and being in contact with said pin for orienting said portion with respect to the axis of said bore, and interengaged portions on said one member and said ring for limiting axial movement of said ring on said one member in the axial direction of the larger ends of said conical surfaces to thereby force against said one member and cause said pin to urge said one member and said another member into further telescopic relation of abutment between said conical surfaces for non-rotative relation between said members.

References Cited in the file of this patent

FOREIGN PATENTS 252,837   Switzerland _____ Nov. 1, 1948